United States Patent [19]

Bailly et al.

[11] Patent Number: 5,098,875
[45] Date of Patent: Mar. 24, 1992

[54] PROCESS FOR PREPARING A ZIEGLER-NATTA TYPE CATALYST

[75] Inventors: Jean-Claude A. Bailly, Martigues; Patrick Behue, Istres, both of France

[73] Assignee: BP Chemicals Limited, London, England

[21] Appl. No.: 628,220

[22] Filed: Dec. 17, 1990

[30] Foreign Application Priority Data

Jan. 3, 1990 [FR] France .................... 90 00136

[51] Int. Cl.$^5$ ............................. C08F 4/68
[52] U.S. Cl. ......................... 502/10; 502/104; 502/111; 502/121; 502/122; 502/123; 502/124; 502/125; 502/126; 502/127; 502/134; 526/125
[58] Field of Search ........... 502/9, 10, 104, 111

[56] References Cited

U.S. PATENT DOCUMENTS

| | | | |
|---|---|---|---|
| 4,363,746 | 12/1982 | Capshew | 502/104 X |
| 4,481,301 | 11/1984 | Nowlin et al. | 502/104 |
| 4,960,741 | 10/1990 | Bailly et al. | 502/10 |

FOREIGN PATENT DOCUMENTS 0155770 9/1985 European Pat. Off. .
0336545 10/1989 European Pat. Off. .

*Primary Examiner*—Patrick P. Garvin
*Attorney, Agent, or Firm*—Brooks Haidt Haffner & Delahunty

[57] ABSTRACT

The present invention relates to a process for preparing a Ziegler-Natta type catalyst based on a vanadium compound. The process comprises sequentially contacting within a liquid hydrocarbon a spheroidal support comprising (i) $MgCl_2$ free from any Mg-C bond and (ii) an electron-donor D1 free from labile hydrogen, an electron-donor D2 containing labile hydrogen and an organometallic compound capable of reducing a vanadium compound, (2) washing the solid product with a liquid hydrocarbon resulting from the contacting, and (3) contacting the washed solid product with one or more vanadium compounds soluble in the liquid hydrocarbon, comprising halogen atoms and alkoxy radical, both being bonded to the same or different vanadium atoms. The catalyst which consists of spheroidal particles without fines, is very active in olefin polymerization and is particularly suitable for producing elastomeric copolymers of propylene.

9 Claims, No Drawings

PROCESS FOR PREPARING A ZIEGLER-NATTA TYPE CATALYST

The present invention relates to a process for the preparation of a catalyst of the Ziegler Natta type, based on vanadium, supported on a magnesium chloride. This catalyst is suitable for the polymerization of olefins such as ethylene and is particularly adapted to the manufacture of elastomeric propylene copolymers, especially according to a gas phase copolymerization process.

It is known that catalytic systems of the Ziegler Natta type consist of a catalyst comprising at least one compound of a transition metal, such as titanium, and of a cocatalyst comprising at least one organometallic compound of a metal such as aluminium. It is known, furthermore, that the properties of these catalysts can be greatly affected when the transition metal compound is employed with a support consisting of a solid inorganic compound, such as magnesium chloride. In the technique of the preparation of a supported catalyst the properties of the support and the process for preparing the catalyst, which generally consists in fixing the transition metal compound on the said support, are of very great importance for the catalyst's characteristics and behaviour in a reaction of polymerization or copolymerization of olefins.

According to European Patent Application EP-A-0,099,772, it is known to prepare a catalyst by precipitation of a transition metal compound on a spheroidal support of magnesium chloride which includes products containing an Mg-C bond and a low proportion of an electron-donor compound. The transition metal compound is a halogenated titanium compound and the precipitation of the latter on the support is performed by a reaction of reduction of the titanium compound with a reducing agent, such as an organometallic compound. This catalyst is employed for the manufacture of ethylene polymers. It has been observed, however, that it does not allow elastomeric propylene copolymers to be manufactured in satisfactory conditions.

According to European Patent Application EP-A-0,155,770, it is known to prepare a catalyst by precipitation of a vanadium compound on a spheroidal support of magnesium chloride which includes products containing an Mg-C bond and a small quantity of an electron-donor compound. The precipitation is performed by a reaction of reduction of the vanadium compound in the presence of this support, without addition of a reducing agent. The reduction reaction is in all probability initiated spontaneously by the products containing an Mg-C bond which are present in the support. The catalyst is employed for manufacturing ethylene polymers having a broad molecular weight distribution. It has been observed, however, that this process requires the use of a large quantity of the vanadium compound, only a small proportion of which is fixed on the support. Catalyst washing operations are generally necessary to remove the excess of the vanadium compound which is not fixed on the support, operations which are costly and difficult because of the toxic and corrosive nature of vanadium compounds.

According to European Patent Application EP-A-0 336 545, it is known to prepare a catalyst based on titanium tetrachloride and supported on a spheroidal support of magnesium chloride. However, no reducing agent is used during the preparation of the catalyst.

A process for the manufacture of a spheroidal catalyst based on vanadium supported on magnesium chloride has now been found, a process which enables the disadvantages mentioned above to be avoided. In particular, this process makes it possible to prepare a spheroidal vanadium catalyst which exhibits a high activity in the polymerization of olefins. This catalyst is particularly adapted to the manufacture of elastomeric propylene copolymers, especially using a gas phase copolymerization process. In this case, the catalyst enables an elastomeric propylene copolymer powder to be manufactured directly in the form of spheroidal and nonadhesive particles, this powder having high bulk density, good flow properties and being easy to handle.

The subject matter of the present invention is a process for the preparation of a catalyst of the Ziegler Natta type based on a vanadium compound which is precipitated by reduction of vanadium onto a support of magnesium chloride, a process being characterized the following steps: (1) bringing into contact within a liquid hydrocarbon a support comprising (i) from 80 to 99.5 mol % of magnesium dichloride which is substantially free from any product containing an Mg-C bond and (ii) from 0.5 to 20 mol % of an electron-donor compound (D1) free from labile hydrogen, the said support being in the form of spheroidal particles which have a mass-average diameter, Dm, of 10 to 100 microns and a narrow particle size distribution such that the ratio of Dm to the number-average diameter, Dn, of the particles is not higher than 3, successively with at least one electron-donor compound (D2) containing labile hydrogen, and then at least one organometallic compound capable of reducing the vanadium compound, (2) washing with liquid hydrocarbon and (3) bringing the washed solid product into contact with one or more vanadium compounds which comprise halogen atoms, X, and alkoxy radicals, $OR^1$, and which are soluble in the liquid hydrocarbon, the halogen atoms, X, and the alkoxy radicals, $OR^1$, being bonded to the same or different vanadium atoms.

According to the present invention, the preparation of the catalyst employs a special magnesium chloride support. The support is substantially free from products containing an Mg-C bond, e.g. with a ratio of the number of Mg-C bonds to the number of magnesium atoms in the support less than 0.001. The support is therefore not capable of spontaneously reducing a vanadium compound. The atomic ratio Cl/Mg of the support is substantially equal to 2. The support contains from 80 to 99.5 mol % preferably 80 to 95 mol %, especially 80 to 90 mol % of magnesium dichloride and from 0.5 to 20 mol % preferably 5 to 20 mol %, especially 10 to 20 mol % of compound D1.

The organic electron-donor compound, D1, is known as such, or as a Lewis base. It is free from labile hydrogen and, consequently, cannot be chosen from water, alcohols or phenols, for example. It may have a relatively low complexing power in relation to magnesium dichloride. It is advantageously chosen from ethers, thioethers, carboxylic acid esters, sulphones, sulphoxides, tertiary phosphines, phosphoramides, tertiary amines and secondary amides. It is preferred to employ electron-donor compounds of low complexing power, such as cyclic or non-cyclic ethers.

Preferably the support is in the form of a homogeneous composition, i.e. the compound D1 is distributed homogeneously throughout the magnesium chloride particle, from the core to the periphery of the latter, and not only at its periphery. As a result, in order to obtain a support of this kind, it is recommended to prepare it by a method using a precipitation technique.

The support yields high-performance catalysts, capable of withstanding the enormous growth stresses during a polymerization particularly in gaseous phase, when it has an essentially amorphous structure, substantially or completely free from crystallinity. This particular form of the support can be obtained by a precipitation technique carried out, for example, as described below.

The support consists of spheroidal particles which have a mass-average diameter from 10 to 100 microns, preferably 15 to 70, especially 20 to 50 microns. The particles of the support have a very narrow particle size distribution such that the ratio Dm/Dn of the mass-average diameter, Dm, to the number-average diameter, Dn, is not higher than 3, preferably not higher than 2.5 and especially not higher than 2 such as 1 to 3, or 1 to 2.5, or 1 to 2, and especially 1.1 to 1.5. Preferably, there is a virtually total absence of particles of diameter greater than $1.5 \times Dm$ or smaller than $0.6 \times Dm$; the particle size distribution is usually such that more than 90% by weight of the particles of the same single batch have a particle size in the range $Dm \pm 10\%$.

The support consists of spheroidal particles which have a substantially spherical shape, in which, if D and d denote the longer and the shorter axes of the particles respectively, the ratio D/d is close to 1, generally less than or equal to 1.5, preferably 1.3 or less, such as 1 to 1.5 or 1 to 1.3.

The specific surface area (BET) of the support particles may be from 20 to 100 m2/g, preferably from 30 to 60 m2/g.

The support may especially be prepared by reacting a dialkylmagnesium compound with an organic chlorine compound in the presence of the electron-donor compound, D1, which acts as a complexing agent and not as a reactant. For this reason in this production process, the compound D1 cannot be chosen from electron donor compounds such as carboxylic acid esters, capable of reacting with organomagnesium compounds. The dialkylmagnesium compound chosen may be a product of formula $R^1MgR^2$, in which $R^1$ and $R^2$ are identical or different alkyl radicals containing from 2 to 12 carbon atoms, and which is soluble in the hydrocarbon medium in which the preparation of the support will preferably be carried out. The organic chlorine compound is an alkyl chloride of formula $R^3Cl$ in which $R^3$ is a secondary or, preferably, tertiary alkyl radical containing from 3 to 12 carbon atoms. It is preferred to employ, as the electron-donor compound D1, an ether of formula $R^4OR^5$ in which $R^4$ and $R^5$ are identical or different alkyl radicals, especially containing from 1 to 12 carbon atoms.

The various reactants used for the preparation of the support may be employed with:

a molar ratio $R^3Cl/R^1MgR^2$ of from 1.9 to 2.5, preferably 2 to 2.3, a molar ratio $D1/R^1MgR^2$ of from 0.1 to 1.2, preferably 0.3 to 0.8.

The reaction between $R^1MgR^2$ and $R^3Cl$ in the presence of the electron-donor compound, D1, is a precipitation which takes place in an inert liquid hydrocarbon e.g. one or more alkanes of 5 to 12 carbon atoms, with stirring, preferably at a temperature of 0° to 100° C. To obtain an excellent support, in particular one with a large quantity of the electron-donor compound, D1, it is recommended to perform the precipitation reaction at a relatively low temperature, ranging from 10° to 80° C., preferably from 15° to 50° C. especially from 15° to 35° C. Preferably the precipitation reaction should proceed extremely slowly, over a period of at least 5 hours and preferably of at least 10 hours e.g. 10 to 50 hours, in particular a period ranging from 10 to 24 hours, so as to permit a suitable formation of the solid product, in particular to facilitate the insertion of a large quantity of the compound D1 and to ensure its uniform dispersion in the support.

The preparation of the catalyst according to the present invention consists in bringing the magnesium chloride support into contact firstly with at least one electron-donor compound containing labile hydrogen, D2. The latter may be chosen from a large number of kinds of organic electron-donor compounds capable of losing a hydrogen atom and preferably soluble in liquid hydrogen carbons. The compound D2 is preferably chosen from alcohols, phenols, primary or secondary phosphines, primary or secondary amines, primary amides and carboxylic acids, each of which may be aliphatic, cycloaliphatic, aromatic or aromatic alkyl and may contain from 1 to 20 carbon atoms. The preferred compound D2 is chosen from alcohols and phenols. In particular, an alcohol containing from 1 to 12 carbon atoms can be employed, especially ethanol, propanol, n-butanol, n-pentanol, 2-ethylhexanol or n-hexanol. A phenol such as an alkyl phenol with 1 to 4 carbon atoms in the alkyl group, e.g. para-cresol can also be employed. The compound D2 preferably exhibits a complexing power for magnesium chloride which is greater than that of the compound D1.

Step 1 of the catalyst preparation may be carried out by using from 0.1 to less than 2 moles, preferably from 0.5 to 1.5 moles of the compound D2 per mole of magnesium of the support. The contacting is preferably carried out with agitation, e.g. stirring in a liquid hydrocarbon, in particular a saturated aliphatic hydrocarbon such as n-hexane or n-heptane, or a mixture. The contact between the support and the compound D2 may take place at a temperature ranging from 0° to 120° C., preferably from 0° to 80° C. It may last from 10 minutes to 10 hours, preferably from 30 minutes to 5 hours. In practice, the contact may be produced in various ways. For example, the compound D2 may be added slowly or fast to a suspension of the support agitated, e.g. stirred in a liquid hydrocarbon, with an addition time e.g. from 10 minutes to 5 hours, preferably from 15 minutes to 2 hours. The suspension of the support in the liquid hydrocarbon may also be added to the compound D2 with agitation, e.g. stirring. The compound D2 may be employed in the pure state or in solution in a liquid hydrocarbon.

Most of the compound D2 employed in contacting the support generally remains fixed in the support without modifying appreciably the morphology and the particle size distribution of the support although the size and the surface area (BET) of the support may increase appreciably. Once treated with the compound D2, the support may be washed one or more times with a liquid hydrocarbon. The solid preoduct resulting from this contacting may have the general formula; $MgCl_2$, x D1 y D2 wherein D1 and D2 denote the above-mentioned electron-donor compounds, x is a number ranging from 0.0005 to 0.15, especially from 0.001 to 0.1 and y is a number ranging from 0.1 to 2, especially from 0.5 to 1.5. Bringing the support into contact with the compound D2 prior to the contact with an organometallic compound capable of reducing a vanadium compound, is a preferred method in the preparation of the catalyst, because it will give an even greater possibility of fixing a relatively large quantity of the vanadium compound(s) in the support and of yielding a catalyst free from fine or microfine particles, compared to using D1 alone.

The preparation of the catalyst consists in next bringing the support into contact with at least one organometallic compound which is capable of reducing a vanadium compound at one of its maximum valency states, and which may be chosen from organometallic compounds of metals belonging to group II or III of the Periodic Classification of the elements. The organometallic compounds may be chosen from organoaluminium, organomagnesium or organozinc compounds. The preferred organometallic compounds are the organoaluminium compounds corresponding to the general formula $$AlR_pX_{3-p}$$

in which formula R denotes an alkyl radical containing from 1 to 12 carbon atoms, X denotes a hydrogen atom, or a halogen atom such as chlorine or bromine, or an alkoxy radical containing from 1 to 10 carbon atoms, and p is a whole or fractional number ranging from 1 to 3, preferably from 2 to 3. In particular, triethylaluminium, triisobutylaluminium, tri-n-hexylaluminium, tri-n-octylaluminium or diethylaluminium chloride may be employed. The quantity of the organometallic compound employed during the catalyst preparation may be from 0.1 to 2, preferably 0.5 to 1.5 moles per mole of the magnesium of the support. The organometallic compound may be also employed in a quantity in relation to the compound D2 used, particularly from 0.5 to 1.5, preferably from 0.8 to 1.2 moles of the organometallic compound per mole of the compound D2 used. It is generally preferred to use a quantity of the organometallic compound which is substantially equimolar to the quantity of compound D2 employed in the first contact. If the quantity of the organometallic compound used is too small in relation to the compound D2, the catalyst will have a low vanadium content. On the contrary, if this quantity is too high, the catalyst will have a poor activity in the polymerization.

The contact between the support and the organometallic compound is preferably produced with agitation e.g. stirring in a liquid hydrocarbon, in particular a saturated aliphatic hydrocarbon such as n-hexane or n-heptane, or a mixture. It may take place at a temperature ranging from 0° to 120° C., preferably from 0° to 100° C. It may last from 10 minutes to 10 hours, preferably from 20 minutes to 5 hours. In practice, the contact may be produced in various ways. The organometallic compound may, for example, be added to a suspension of the support agitated e.g. stirred in a liquid hydrocarbon. The addition may be slow or fast, and last 1 minute to 5 hours, preferably 5 minutes to 2 hours. The suspension of the support in the liquid hydrocarbon may also be added to the organometallic compound with agitation, e.g. stirring. The organometallic compound may be employed in the pure state or in solution in a liquid hydrocarbon.

A part of the organometallic compound becomes fixed in the support during this contacting. According to the present invention it is also recommended to wash the support after these two operations of bringing into contact. The support is washed one or more times with a liquid hydrocarbon, in particular a saturated aliphatic hydrocarbon e.g. of 5 to 12 carbon atoms, such as n-hexane or n-heptane, or a mixture. The liquid hydrocarbon used for the washing (step 2) may be identical to or different from that of the support suspension. The washing or washings are preferably performed with agitation, e.g. stirring, over a period which may range from 10 minutes to 2 hours, preferably from 20 minutes to 1 hour, at a temperature ranging from 0° to 120° C., preferably from 0° to 80° C. In practice a washing generally consists in adding the liquid hydrocarbon to the agitated, e.g. stirred suspension of the support, in keeping the mixture thus obtained agitated, e.g. stirred and then in stopping the agitation e.g. the stirring, allowing the solid support to settle and in removing a part of the supernatant liquid phase. The washing operation may be repeated a number of times, preferably until the liquid phase of the support suspension contains in solution a quantity of metal of the organometallic compound which is less than 1 mol % relative to the quantity of vanadium compound(s) used subsequently.

The last stage of the catalyst preparation consists in bringing the washed solid support into contact with one or more vanadium compounds which are soluble in a liquid hydrocarbon.

The vanadium compound(s) comprise halogen atoms, X, and alkoxy radicals, $OR^1$ both X and $OR^1$ being bonded to the same or different vanadium atoms. The most suitable catalysts for manufacturing elastomeric propylene copolymers in the gaseous phase are those prepared with vanadium compound(s) in which the molar ratio $X/OR^1$ is from 0.05 to 20, preferably from 1 to 10, especially from 1.5 to 6. With catalysts thus obtained, it has been surprisingly noted that it is possible to manufacture directly in gaseous phase polymerisation an elastomeric copolymer powder which is nonadhesive and which has good flow properties.

More particularly, the vanadium compound(s) may correspond to one of the two general formulae

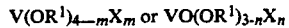

in which formulae $R^1$ denotes an alkyl radical containing from 1 to 12 carbon atoms, X a halogen atom such as bromine or chlorine, m is a whole or fractional number ranging from 0.2 to 3.8, preferably from 2 to 3.6 and n is a whole or fractional number ranging from 0.14 to 2.85, preferably from 1.5 to 2.7. The vanadium compound(s) may be prepared by producing an appropriate mixture of a vanadium halide of formula $VOX_3$ or $VX_4$ with a vanadium alkoxide of formula $VO(OR^1)_3$ or $V(OR^1)_4$, or else a mixture of a vanadium halide of formula $VOX_3$ or $VX_4$ with an alcohol of formula $R^1OH$, the groups X and $R^1$ of the formulae having the same definitions as those mentioned above. Advantageously, vanadium tetrachloride or vanadyl trichloride are employed among vanadium halides, and, among vanadium alkoxides, it is preferred to employ vanadyl tri-n-propoxide, vanadyl triisopropoxide, vanadyl tri-n-butoxide, vanadium tetra-n-butoxide, or vanadium tetra-n-propoxide. The vanadium compound(s) may be prepared either before their use for preparation of the catalyst or directly in the liquid hydrocarbon in which the contact will be produced, optionally in the presence of the support. The vanadium compound or compounds employed are soluble in liquid hydrocarbons, especially saturated aliphatic hydrocarbons e.g. 5 to 12 carbon atoms.

The quantity of vanadium compound used to prepare the catalyst depends on the desired quantity of vanadium to be fixed in the support. The quantity of vanadium compound to be employed during the contact with the support is generally from 0.05 to 2 moles, preferably from 0.1 to 1 mole, per mole of magnesium of the support.

The contact between the support and the vanadium compound(s) is preferably produced with agitation, e.g. stirring in a liquid hydrocarbon in which the said vanadium compound or compounds are soluble. The liquid hydrocarbon may be a saturated aliphatic hydrocarbon e.g. of 5 to 12 carbon atoms, such as n-hexane or n-heptane, or a mixture. The contact may take place at a temperature ranging from 0° to 120° C., preferably from 20° to 100° C. In practice, it may take place in various ways. It is possible, for example, to add the vanadium compound(s) to a suspension of the support agitated, e.g. stirred in the liquid hydrocarbon. The addition may be slow or quick, and last from 10 minutes to 3 hours, preferably from 30 minutes to 2 hours, at a temperature ranging from 10° to 70° C. After the addition, the mixture thus obtained may be agitated, e.g. stirred for a period of 10 minutes to 5 hours, preferably from 30 minutes to 3 hours, at a temperature ranging from 20° to 120° C., preferably from 30° to 100° C.

When at least two vanadium compounds are brought into contact with the support, they may be added to the support simultaneously or in succession one after the other, or else in the form of a premix.

The vanadium compound(s) may be used in the pure state, in liquid form, or in solution in a liquid hydrocarbon such as one or more alkanes e.g. of 5 to 12 carbon atoms. Although most, if not all, of the quantity of the vanadium compound which is employed becomes fixed in the support, the catalyst may be washed one or more times with a liquid hydrocarbon such as that described above.

This bringing of the support into contact with the vanadium compound(s) actually consists of a precipitation of the vanadium compound(s) in the support by a reduction reaction which changes tetravalent vanadium to a valency state of less than 4 and/or trivalent vanadyl to a valency state of less than 3. The process of the present invention has the advantage of reducing the vanadium to a valency state which is immediately below that in which the vanadium compound(s) have been used. Thus, the vanadium may be reduced solely to the valency state of 3 when a tetravalent vanadium compound has been used. When a trivalent vanadyl compound is employed, a catalyst with only a divalent vanadyl may be obtained. The reducing agent is the compound resulting from the contact between the organometallic compound and the support. It is particularly surprising to find that the precipitation of the vanadium compound(s) takes place exclusively in the support and that solid particles consisting essentially of a compound of vanadium in a reduced state and comprising no support are substantially not produced during the catalyst preparation. It is particularly advantageous to observe that the catalyst thus obtained is free from fine or microfine particles active in polymerization.

It is surprisingly found that the essentially amorphous structure, the size, the particle size distribution and the morphology of the support do not change during the catalyst preparation. Thus, the catalyst obtained consists of particles whose physical properties are practically identical with those of the particles of the initial support. In particular, the catalyst consists of spheroidal particles which have a mass-average diameter from 10 to 100 microns, preferably from 15 to 70 microns especially from 20 to 50, and a particle size distribution, measured as the ratio of the mass-average diameter Dm to the number-average diameter Dn, which is not higher than 3, preferably not higher than 2.5, especially not higher than 2.

The advantage of this preparation is linked with the fact that most, if not all, of the vanadium compound(s) employed becomes fixed in the support. It is generally found that more than 90%, and even more than 99%, of the vanadium compound(s) employed during the preparation becomes fixed in the support. Another characteristic of this process is that the vanadium compound is fixed homogeneously throughout the support, making the catalyst more robust during the polymerization. The combination of these advantages is due to the fact that a special support containing the compound D1 is employed and that this support is first brought into contact with the compound D2. It was observed, furthermore, that the catalyst includes a part of the organometallic compound employed as a reducing agent during the preparation, but in a form converted by being brought into contact with the support and by the reduction reaction. The catalyst thus obtained may contain from 2 to 12% by weight of vanadium. It may be employed for polymerizing or copolymerizing olefins containing from 2 to 12 carbon atoms, such as ethylene, propylene, 1-butene, 1-hexene, 4-methyl-1-pentene or 1-octene. It is particularly suitable for the manufacture of polyethylene, of copolymers of ethylene and of alpha-olefin containing from 3 to 12 carbon atoms, and of elastomeric propylene copolymers, especially those containing from 30 to 70% by weight of propylene and from 70% to 30% by weight of ethylene and/or of 1-butene and optionally an unconjugated diene, such as ethylidenenorbornene, 4-methyl-1,4-hedadiene and 2-methyl-1,5-hexadiene, 1,5-hexadiene, dicyclopentadiene or 1,4-hexadiene. The elastomeric copolymers may be especially manufactured by polymerisation in a suspension, or in a gaseous phase in a reactor containing a fluidized and/or mechanically sitrred bed. The catalyst is employed in the presence of a cocatalyst chosen from the organometallic compounds of a metal belonging to groups I and III of the Periodic Classification of the elements, and optionally in the presence of an activator chosen from halogenated hydrocarbons e.g. $CHCl_3$, $CFCl_3$ or dichloroethane. The cocatalyst may be an organoaluminium compound, e.g. a trialkylaluminium, an alkylaluminium hydride, an alkylaluminium alkoxide, or an alkylaluminium halide, such as the triethylaluminium, triisobutylaluminium, tri-n-hexylaluminium, tri-n-octylaluminium, or diethylaluminium chloride. The catalyst and the cocatalyst are generally employed in proportions such that the molar ratio of the quantity of metal of the cocatalyst to the quantity of vanadium of the catalyst is between 0.5 and 50. The (co)polymerization reaction may be performed at a temperature of 0° C. to 100° C., preferably 0° C. to 60° C. for producing elastomeric copolymers, at a total pressure ranging from 0.1 to 5 MPa e.g. 0.5 to 3 MPa. The catalysts prepared according to the invention may be used directly or after having been subjected to an olefin prepolymerization operation carried out in one or more stages in a gaseous phase and/or in suspension in a liquid hydrocarbon medium. The prepolymerization operation results in an increase in the size of the catalyst particles while preserving the morphology of the latter. It consists in bringing the catalyst and a cocatalyst such as described above into contact with one or more olefins e.g. $C_2$ to $C_8$ alpha-olefins, such as ethylene or propylene. The prepolymerization reaction may be continued until 10 to 500 g and preferably 30 to 250 g of polyolefin is obtained per millimole of vanadium. An antistatic agent, e.g. "ASA3" (Registered Trade Mark) sold by Shell may be used during the (co-)polymerization or the prepolymerization.

During the (co)polymerization reaction a uniform development of the (co)polymer particles is observed, their spheroidal shape being preserved and the particle size distribution remaining narrow. It is possible, in particular, to obtain an elastomeric propylene copolymer consisting of a nonadhesive powder which consists of spheroidal particles and which exhibits good flow properties and a high bulk density, generally of between 0.3 and 0.5 8/cm3. The elastomeric copolymer has a relatively narrow molecular weight distribution, characterized by a ratio of the weight-average molecular mass, Mw, to the number-average molecular mass, Mn, of between 3 and 11. Furthermore it may contain a very low concentration of vanadium, generally less than 15 parts per million by weight.

Method of determining the mass-average (Dm) and number-average (Dn) diameters of particles According to the invention, the mass-average (Dm) and number-average (Dn) diameters of the support or catalyst particles are measured on the basis of microscopic observations by means of the Optomax image analyser (Micro-Measurements Ltd. Great Britain). The principle of the measurement consists in obtaining, from the experimental study of a population of particles using optical microscopy, a frequency table which gives the number (ni) of particles belonging to each class (i) of diameters, each class (i) being characterized by an intermediate diameter (di) included within the limits of the said class. According to the approved French Standard NF X 11-630 of June 1981, Dm and Dn are given by the following formulae:

$$\text{mass-average diameter: } Dm = \frac{\Sigma\, n_i(di)^3 di}{\Sigma\, n_i(di)^3}$$

$$\text{number-average diameter: } Dn = \frac{\Sigma\, n_i\, di}{\Sigma\, n_i}$$

The ratio Dm/Dn characterizes the particle size distribution; it is sometimes called "width of the particle size distribution". The measurement using the Optomax image analyser is carried out by means of an inverted microscope which permits the examination of the suspensions of support or catalyst particles with a magnification of between 16 and 200 times. A television camera picks up the images given by the inverted microscope and transmits them to a computer which analyses the images received line by line and point by point on each line, in order to determine the particle dimensions or diameters and then to classify them.

Measurement of the molecular weight distribution

The molecular weight distribution of a polymer is calculated according to the ratio of the weight-average molecular weight, Mw, to the number-average molecular weight, Mn, of the polymer, from a molecular weight distribution curve obtained by means of a "Waters" (Trade-mark) model "150 C"(R) gel permeation chromatograph (High Temperature Size Exclusion Chromatograph), the operating conditions being the following:

solvent: 1,2,4-trichlorobenzene
solvent flow rate 1 ml/minute
three "Shodex"(R) model "AT 80 MS" columns
temperature: 150° C.
sample concentration: 0.1% by weight
injection volume: 500 microlitres
detection by a refractometer integral with the chromatograph
calibration using a high density polyethylene sold by BP Chemicals under the trade name "Rigidex 6070 EA"(R): Mw=65,000 and Mw/Mn=4, and a high density polyethylene which has: Mw=210,000 and Mw/Mn=17.5.

The following nonlimiting examples illustrate the invention.

EXAMPLE 1

Preparation of a magnesium chloride support 204 ml (1 mole) of diisoamyl ether (DIAE) were introduced at ambient temperature (20° C.) and under nitrogen atmosphere into a 5-litre stainless steel reactor equipped with a stirrer system rotating at 325 revolutions/minute and containing 2 moles of dibutylmagnesium in solution in 3 1 of n-hexane. The reactor was maintained at 25° C. 484 ml (4.4 moles) of tert-butyl chloride were introduced into it over 12 hours. The mixture was then kept stirred for 3 hours at 25° C. The solid product obtained was washed four times, each with 2 litres of n-hexane. 2 moles of magnesium chloride were thus obtained, in the form of spheroidal particles with a mean diameter Dm=35 microns and a particle size distribution Dm/Dn=1.6 and having a DIAE/Mg molar ratio=0.15 and a Cl/Mg molar ratio=2.

Preparation of a catalyst 300 ml of n-hexane containing 0.1 mole of magnesium chloride prepared above were introduced under nitrogen atmosphere and at 20° C. into a one-litre glass reactor equipped with a stirrer system rotating at 300 revolutions/minute. The reactor was heated to 30° C. 20 ml of n-hexane containing 0.1 mole of n-butanol were introduced into it over 1 hour. After the mixture had been kept stirred for 0.5 hours at 30° C., the solid obtained was washed twice, each with 0.5 litres of n-hexane at 25° C. The volume of the suspension was brought back to 150 ml by removing part of the supernatant liquid phase. 100 ml of n-hexane containing 0.1 mole of triethylaluminium were then introduced into the stirred suspension over 1 hour at 50° C. After the mixture had been kept stirred for 1 hour at 80° C., the solid obtained was washed twice, each with 0.5 litres of n-hexane at 50° C. and twice, each with 0.5 litres of n-hexane at 25° C. The volume of the suspension was brought back to 150 ml by removing part of the supernatant liquid phase. 100 ml of n-hexane containing a mixture consisting of 16 millimoles of vanadyl trichloride and of 4 millimoles of vanadyl tri-n-propoxide were then introduced into the stirred suspension at 30° C. over 2 hours. After the mixture had been kept stirred for 1 hour at 80° C. the solid obtained was washed twice at 50° C., each with 0.5 litres of n-hexane. A spheroidal catalyst which had the following characteristics (molar ratios) was then obtained:

V/Mg=0.19, Al/Mg=0.15, propoxide/Mg=0.1, Cl/Mg=2.55, Dm/Dn=1.8. Dm=31 microns.

EXAMPLE 2

Preparation of a catalyst

The operation was carried out exactly as in Example 1, except for the fact that n-butanol was replaced with absolute ethanol. A spheroidal catalyst which had the following characteristics (molar ratios) was obtained:

V/Mg=0.2, Al/Mg=0.19, propoxide/Mg=0.1, Cl/Mg=2.6, Dm/Dn=1.7. Dm=33 microns.

EXAMPLE 3

Preparation of a prepolymer

Into a 5-litre stainless steel reactor equipped with a stirrer rotating at 750 revolutions/minute were introduced under nitrogen 2 litres of n-hexane which were heated to 70° C., a mixture consisting of 16 millimoles of triethylaluminium and g millimoles of diethylaluminium chloride, and then a quantity of the catalyst prepared in Example 1, containing 4 millimoles of vanadium. 2.5 litres of hydrogen, measured under normal conditions, were then introduced into the reactor, followed by ethylene at a uniform rate of 80 grams/hour for 4 hours. The content of the reactor was transferred to a rotary evaporator and the solvent was evaporated off under reduced pressure at a temperature of 60° C. A prepolymer was thus obtained, which was stored under nitrogen.

Gas phase copolymerization of ethylene and propylene in a stirred bed reactor A powder charge of 200 g of a copolymer powder originating from a preceding copolymerization and which had been stored under nitrogen were introduced under nitrogen atmosphere into a 2.5-litre stainless steel reactor equipped with a helical stirrer for dry powder, rotating at 250 revolutions/minute. After the reactor had been heated to 40.C, 4 millimoles of triisobutylaluminium and 12.5 millimoles of chloroform were introduced into it, followed by a quantity of prepolymer prepared above, corresponding to 0.1 millimole of vanadium. 250 ml of hydrogen, measured under normal conditions, were introduced into it, and a mixture of ethylene and propylene in a C2/C3 molar ratio=60/40, so as to obtain a total pressure 0.5 MPa. The mixture of ethylene and propylene was introduced into the reactor during the reaction so as to keep the total pressure constant. After 6 hours' copolymerization 680 g of a copolymer powder were recovered, consisting of spheroidal particles which had the following characteristics:

vanadium content: 10 parts per million (ppm) by weight
MI5/190: 0.3 g/10 minutes
weight content of ethylene-derived units: 50%
degree of crystallinity: 1%
Dm: 280 microns
Dm/Dn: 1.9 with MI5/190 being the melt index of the copolymer, measured at 190° C. under a 5 kg load.

We claim:

1. Process for the preparation of a catalyst of the Ziegler-Natta type based on a vanadium compound which is precipitated by reduction of vanadium onto a support of magnesium chloride, a process being characterized in the following steps: (1) bringing into contact within a liquid hydrocarbon a support comprising (i) from 80 to 99.5 mol % of magnesium dichloride which is substantially free from any product containing an Mg-C bond and (ii) from 0.5 to 20 mol % of an electron-donor compound (D1) free from labile hydrogen, the said support being in the form of spheroidal particles which have a mass-average diameter, Dm, from 10 to 100 microns and a particle size distribution such that the ratio of Dm to the number-average diameter, Dn, of the particles is not higher than 3, successively with at least one electron-donor compound (D2) containing labile hydrogen, and then with at least one organometallic compound capable of reducing a vanadium compound (2) washing the solid product from step 1 with a liquid hydrocarbon and (3) bringing the washed solid product into contact with one or more vanadium compounds which comprise halogen atom X and alkoxy radicals OR$^1$ and which are soluble in the liquid hydrocarbon, the halogen atoms X and the alkoxy radicals OR$^1$ being bonded to the same or different vanadium atoms.

2. Process according to claim 1, characterized in that the electron-donor compound (D1) is chosen from the group consisting of ethers, thioethers, carboxylic acid esters, sulphones, sulphoxides, tertiary, phosphines, phosphoramides, tertiary amines and secondary amides.

3. Process according to claim 1, characterized in that the electron-donor compound D2, is chosen from the group consisting of alcohols, phenols, primary or secondary phosphines, primary or secondary amines, primary amides and carboxylic acids.

4. Process according to claim 1, characterized in that from 0.1 to less than 2 moles of the compound D2 are used per mole of magnesium of the support.

5. Process according to claim 1, characterized in that the organometallic compound is chosen from the group consisting of organoaluminium, organomagnesium and organozinc compounds.

6. Process according to claim 1, characterized in that from 0.1 to 2 moles of the organometallic compound are used per mole of magnesium of the support.

7. Process according to claim 1, characterized in that the vanadium compound(s) comprise halogen atoms, X, and alkoxy radical, OR$^1$, in a molar ratio X/OR$^1$ ranging from 0.05 to 20.

8. Process according to claim 1, characterized in that the vanadium compound(s) correspond to one of the two general formulae:

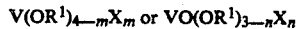

$$V(OR^1)_{4-m}X_m \text{ or } VO(OR^1)_{3-n}X_n$$

in which formulae R$^1$ denotes an alkyl radical containing from 1 to 12 carbon atoms, X is a halogen atom, m is a whole or fractional number ranging from 0.2 to 3.8 and n is a whole or fractional number ranging from 0.14 to 2.85.

9. Process according to claim 1, characterized in that from 0.05 to 2 moles of vanadium compound(s) are used per mole of magnesium of the support.

* * * * *

UNITED STATES PATENT AND TRADEMARK OFFICE
CERTIFICATE OF CORRECTION

PATENT NO. : 5,098,875
DATED : March 24, 1992
INVENTOR(S) : Jean-Claude A. Bailly et al It is certified that error appears in the above-indentified patent and that said Letters Patent is hereby corrected as shown below:

Col. 6, line 4, "The liquid hydrocarbon" should start a new paragraph

Col. 9, line 21, shouldread " 0.5 g/cm3.

Signed and Sealed this

Third Day of August, 1993

Attest:

MICHAEL K. KIRK

Attesting Officer     Acting Commissioner of Patents and Trademarks